(12) United States Patent
Lopez

(10) Patent No.: US 8,234,776 B2
(45) Date of Patent: Aug. 7, 2012

(54) METHOD FOR PROVIDING AND MAGNETIZING A MECHANICALLY KEYED PERMANENT MAGNET ROTOR, RESULTANT MAGNETIC FIELD SYNCHRONIZED WITH THE MECHANICAL KEY

(75) Inventor: Mike Bonilla Lopez, Whittier, CA (US)

(73) Assignee: Electric Motor + Actuator Technologies LLC, Fontana, CA (US)

( * ) Notice: Subject to any disclaimer, the term of this patent is extended or adjusted under 35 U.S.C. 154(b) by 0 days.

(21) Appl. No.: 12/804,333

(22) Filed: Jul. 20, 2010

(65) Prior Publication Data

US 2012/0017426 A1    Jan. 26, 2012

(51) Int. Cl.
*H02K 15/02* (2006.01)
(52) U.S. Cl. ............... 29/598; 29/596; 29/597; 29/732; 310/156.55
(58) Field of Classification Search ............ 29/596–598, 29/732–736; 310/156.11–156.22, 156.55
See application file for complete search history.

(56) References Cited

U.S. PATENT DOCUMENTS

| | | | | |
|---|---|---|---|---|
| 3,246,187 A | * | 4/1966 | Iemura | 310/156.21 |
| 3,728,786 A | * | 4/1973 | Lucas et al. | 29/598 |
| 3,894,255 A | * | 7/1975 | Newton, Jr. | 310/80 |
| 4,060,745 A | * | 11/1977 | Linscott, Jr. | 310/156.22 |
| 6,204,584 B1 | * | 3/2001 | Muszynski | 310/156.08 |
| 8,033,007 B2 | * | 10/2011 | Jeung | 29/598 |

\* cited by examiner

*Primary Examiner* — Minh Trinh

(57) ABSTRACT

A method for making and magnetizing an un-magnetized mechanically keyed permanent magnet rotor that can be magnetized in a magnetization fixture, without regard to the angular position of the rotor in the magnetizing fixture, and nevertheless result in a permanent magnetic field angularly synchronized to said keyed rotor comprises the steps of providing an annular permanent magnet or annular permanent magnet rotor body; a mechanically keyed rotor shaft; means for aligning and assembling the un-magnetized permanent magnet or permanent magnet rotor body and the mechanically keyed rotor shaft during assembly to form an assembled rotor; and magnetization thereof.

2 Claims, 5 Drawing Sheets

US 8,234,776 B2

METHOD FOR PROVIDING AND MAGNETIZING A MECHANICALLY KEYED PERMANENT MAGNET ROTOR, RESULTANT MAGNETIC FIELD SYNCHRONIZED WITH THE MECHANICAL KEY

CROSS-REFERENCE TO RELATED APPLICATIONS

Not Applicable

FEDERALLY FUNDED RESEARCH

Not Applicable

SEQUENCE LISTING OR OTHER PROGRAM

Not Applicable

BACKGROUND OF THE INVENTION

1. Field of Invention

The present invention relates to rotors for dynamoelectric machines and particularly to methodology for building and then magnetizing a permanent magnet rotor assembly, wherein a magnet or magnet rotor body is mounted to a rotor shaft that contains an angular position reference feature, or "mechanical key," and magnetization of the resulting rotor assembly, without regard to any complementary mechanical key on the magnetization fixture, nevertheless keys the resultant magnetic field to the rotor.

2. Prior Art

The manufacture of dynamoelectric machines entails some of the same basic challenges—and more—inherent in any typical machine manufacturing and/or assembly process. Of special consideration are factors relating to the use of permanent magnets, given the structural and magnetic properties of these, often fragile, materials. For example, when, and how, in the build process, are magnets magnetized? There would be great benefit if a rotor could be random-angle magnetized after assembly and the angular position of the resulting permanent magnetic field synchronized with a mechanical key in a shaft.

Permanent magnet magnetization strategy depends on a number of factors, including, but not limited to, energy product, desired number and orientation of magnetic pole pairs, mechanical complexity of the magnet and/or magnet rotor body, magnet composition, and size. In the process of manufacturing a dynamoelectric machine, there exist significant advantages in magnetizing the rotor assembly after magnets have been mounted and the assembly completed. Magnetization in this order can immensely simplify the assembly process. There is no comparison between handling magnetized magnets—especially those with high energy products—and handling un-magnetized, i.e., benign, magnets. Un-magnetized magnets do not have a propensity to slam against magnetic metal, against other magnets, or against operators who have any magnetic material(s) on their person—or who happen to let a finger wander between two unsecured magnets. Un-magnetized magnets also do not affect nearby electronic equipment such as computers or operator terminals used during the assembly process. Anyone who has been around magnets knows that the handling of magnetized magnets involves inordinate care and process safeguards. Otherwise, consequences can be severe or catastrophic.

Figure 1A:
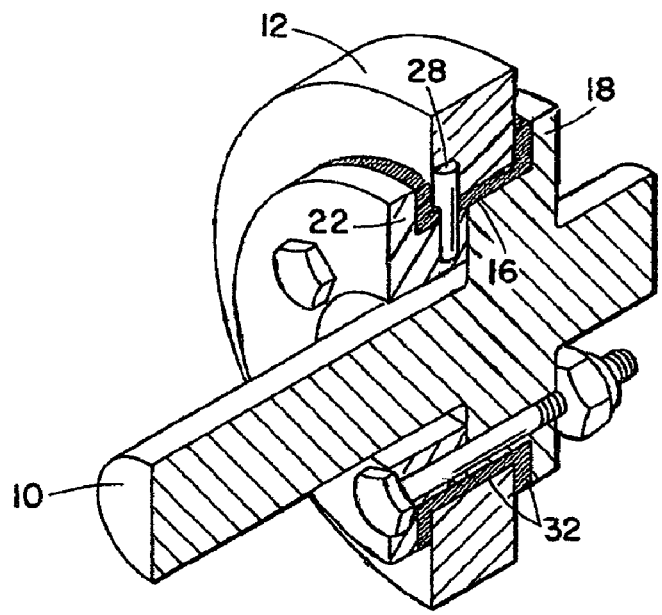
Figure 1B:
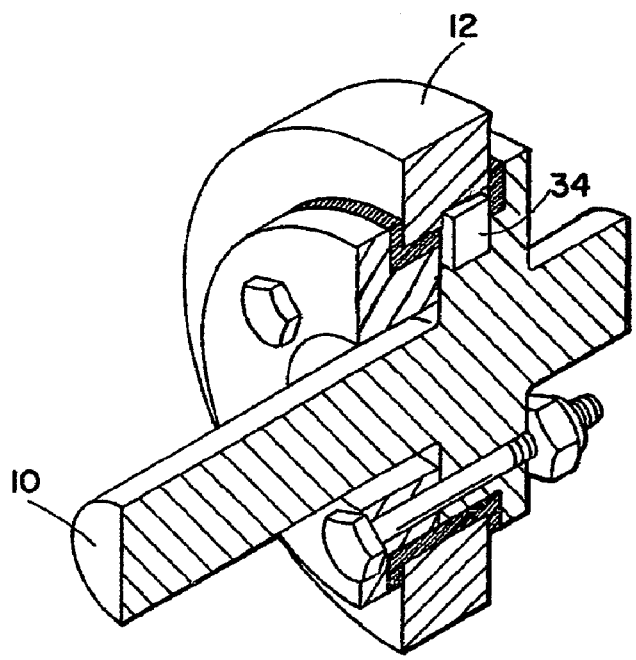

Magnetization of assembled permanent magnet rotors can be quite challenging, especially when the assembly comprises high energy product magnets and a keyed shaft. Prior art is replete with examples of permanent magnets or magnet rotor bodies keyed to a shaft; however, the inventions described therein are methods for safely arresting relative axial and/or rotational movement between the permanent magnet(s) or rotor body and the rotor shaft. For example, U.S. Pat. No. 4,060,745 (1977) to Linscott discloses a method for securing an annular permanent magnet against axial and rotational movement, relative to a shaft, while minimizing stress on the rotatable permanent magnet. The primary structural elements used to accomplish this task are depicted in FIGS. 1A and 1B, wherein "magnet 12 is prevented from rotating with respect to the shaft 10 by means of a pin 28 . . . or a key 34 . . . and shoulders 18 and 22 cooperate to axially retain the magnet 12 on the support surface 16," and "a flexible material 32 is interposed between" contiguous components to protect the magnet 12 from the effects of compressive stresses.

Figure 2:
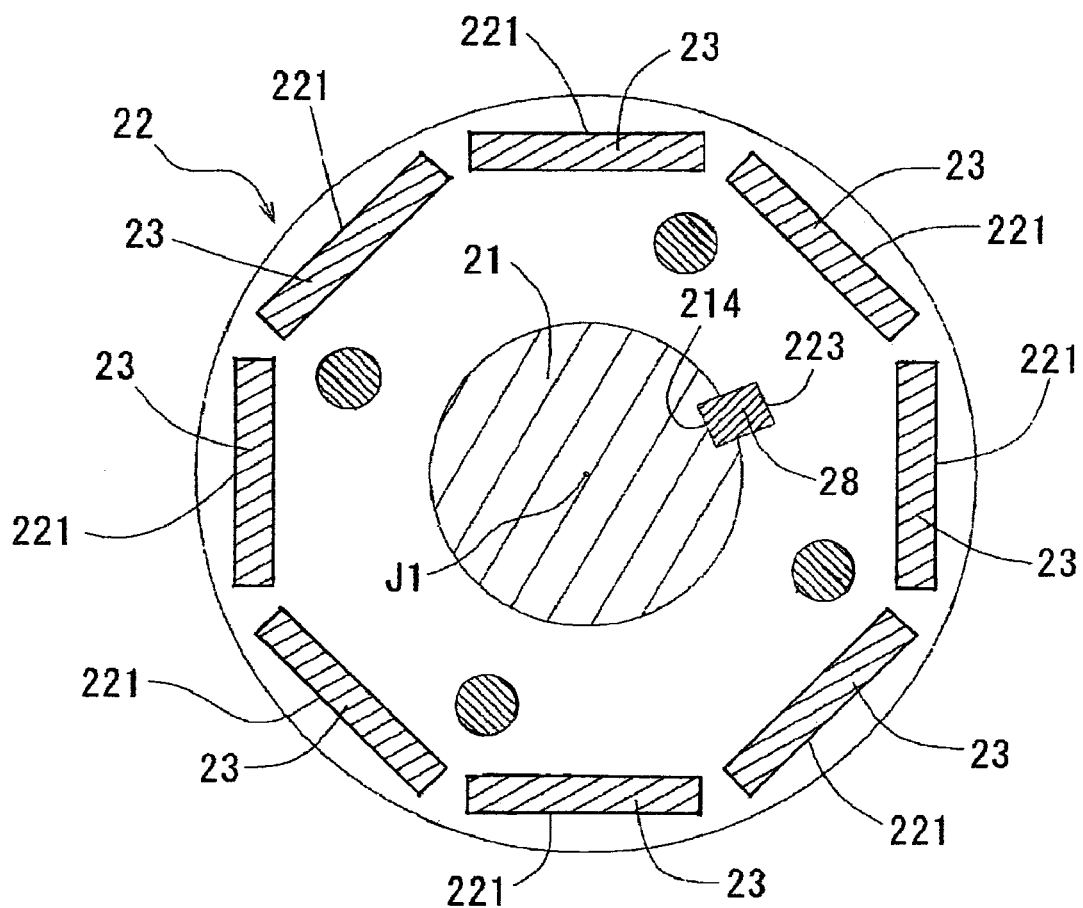

In fact, inventors have taken elaborate measures to arrest relative rotational and axial motion between rotor bodies and shafts, while safeguarding the permanent magnets. FIG. 2 relates to U.S. Pat. No. 7,737,592 to Makino, et al., (2010), and depicts a cross-sectional view of a cylindrical rotor assembly. Said patent discloses a complex assembly in which relative rotational motion between a keyed rotor shaft 21 and a rotor core 22 is restricted when said shaft 21, with shaft side axial groove 214 is arranged concentrically with an axis J1 of said core 22, with core side axial groove 223, such that the axial grooves line up to form an axial hole and a movement restriction member 28 is inserted into said hole. Additionally, relative rotational movement between a plurality of magnets 23 and the shaft 21 is restricted via the insertion of said magnets 23 into a corresponding plurality of axial holes 221 in the core 22. Axial motion is restricted equally rigorously.

Figure 3:
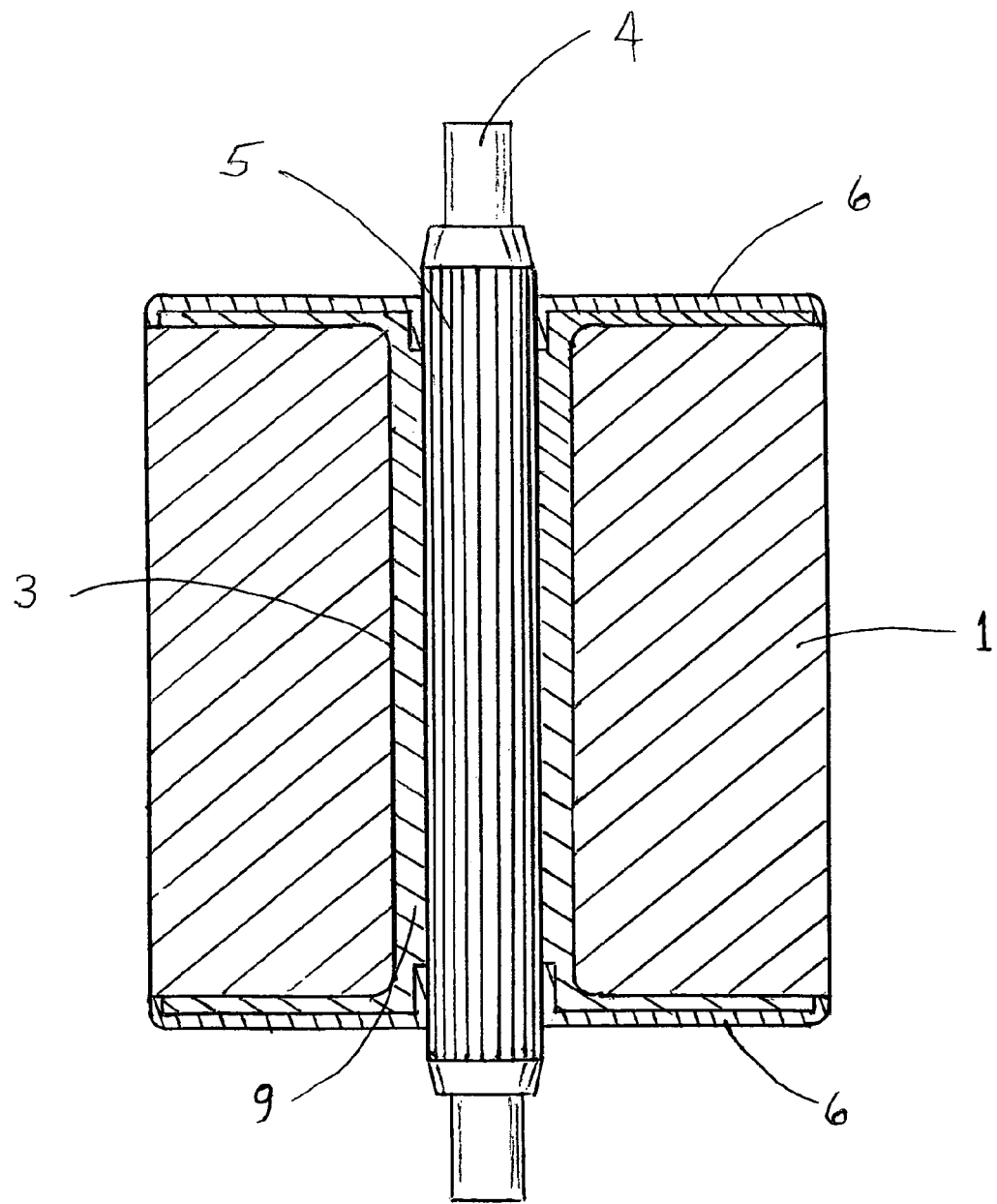

Even inventions with methods that comprise steps of providing structural elements other than keyed shafts have been used to securely mount a rotor body to a rotor shaft. For example, U.S. Pat. No. 3,246,187 to Iemura (1966) discloses a structure that entails use of adhesive and axial ridges, or knurl, placed circumferentially on a non-keyed shaft. FIG. 3 is a cross-sectional view of the cylindrical rotor and a front view of the cylindrical shaft. It includes one adhesive layer 9, retainer disks 6, a magnet core 1, an axial bore 3, and a rotor shaft 4, with knurl 5. Iemura claims that his invention offers a much higher binding strength "than that of conventional rotors in which the retainers and the rotor body are joined to each other and to the rotor shaft with separate adhesive layers, and is enough to prevent the rotor from being damaged by any mechanical shock."

As noted, the patents cited above—and countless other patents—deal with the object of attaching a permanent magnet or magnet rotor body to a keyed or non-keyed shaft to prevent relative motion of components. Another object not obvious or implied in any of these patents, but, in some cases, of equal or greater relevance, relates generally to magnetic—not mechanical—considerations, and specifically to a method for effecting on an already assembled rotor a permanent magnetic field keyed to a keyed shaft. The major disadvantage of the inventions described therein is that they lack this feature.

OBJECTS AND ADVANTAGES

Accordingly, objects and advantages of the present invention are:

a) to provide a method for assembly of an un-magnetized permanent magnet or permanent magnet rotor body that comprises a single magnet mounted onto a mechanically keyed rotor shaft such that, without regard to any angular rotor localization fixture in the magnetization fixture, magnetization of the assembly effects a permanent magnetic field with a single north-south pole pair angularly keyed to the shaft; b) to provide a method for assembly of an un-magnetized permanent magnet rotor body that comprises a plurality of axially contiguous permanent magnets mounted onto a mechanically keyed rotor shaft such that, without regard to the angular orientation of the rotor assembly during magnetization, magnetization of the assembly effects a permanent magnetic field with a single north-south pole pair angularly keyed to the shaft;

SUMMARY

In accordance with the present invention a method for assembly and magnetization of a permanent magnet rotor, magnetic field angularly keyed to a mechanically keyed rotating shaft comprises the steps of providing an un-magnetized permanent magnet, or plurality thereof, of anisotropic material composition and polar grain, with means for coupling to said magnet and grain in specific spatial orientation; providing a shaft with means for aligning to said magnet coupling means; means for assembling said members in specific spatial orientation; and random-angle magnetization thereof.

BRIEF DESCRIPTIONS OF THE SEVERAL VIEWS OF THE DRAWINGS

In the drawings, closely related figures have the same number but different alphabetic suffixes.

FIGS. 1A and 1B are isometric, cross-sectional views of permanent magnet rotors. Each figure depicts a rotor body comprising a magnet 12, support shoulders 18 and 22, support surface 16, securing pin 28 (FIG. 1A), or securing key 34 (FIG. 1B), and a flexible material 32; and a rotor shaft 10.

FIG. 2 is a cylindrically shaped permanent magnet rotor, with cross-sectional view taken orthogonal to an axis J1 of a rotor core 22. The rotor comprises a keyed rotor shaft 21 with shaft side axial groove 214, the rotor core 22 with axis J1 and core side axial groove 223, a movement restriction member 28, and a plurality of magnets 23 fitted into a corresponding plurality of axial holes 221.

FIG. 3 is a cross-sectional view of a cylindrical rotor body and a front view of a cylindrical rotor shaft. The complete rotor comprises one adhesive layer 9, a plurality of retainer disks 6, a magnet core 1, an axial bore 3, and the rotor shaft 4, with knurl 5.

Figure 4A:
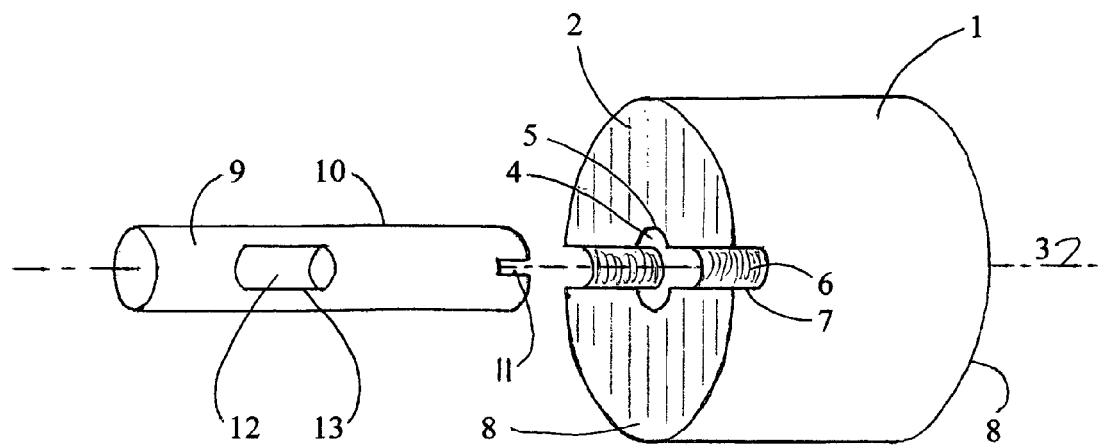
Figure 4B:
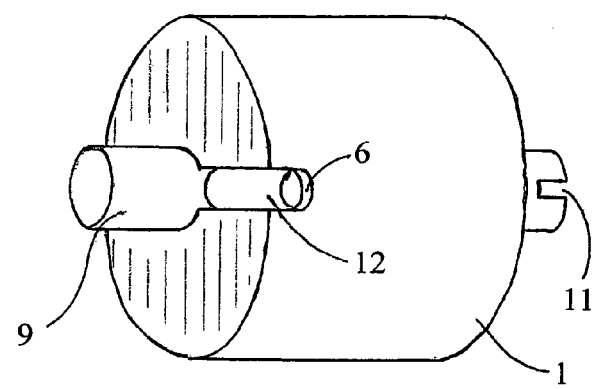

FIGS. 4A and 4B show an unassembled view and an assembled view, respectively, of one example of the coupling means the invention comprises. In this example, one annular magnet 1, with polar grain, 2 rotor axis 3; magnet bore 4, and magnet coupling means 6 orthogonal to said grain, 2 is paired with a shaft, 9 and alignment means 12, to form the assembly shown in FIG. 4B.

Figure 5:
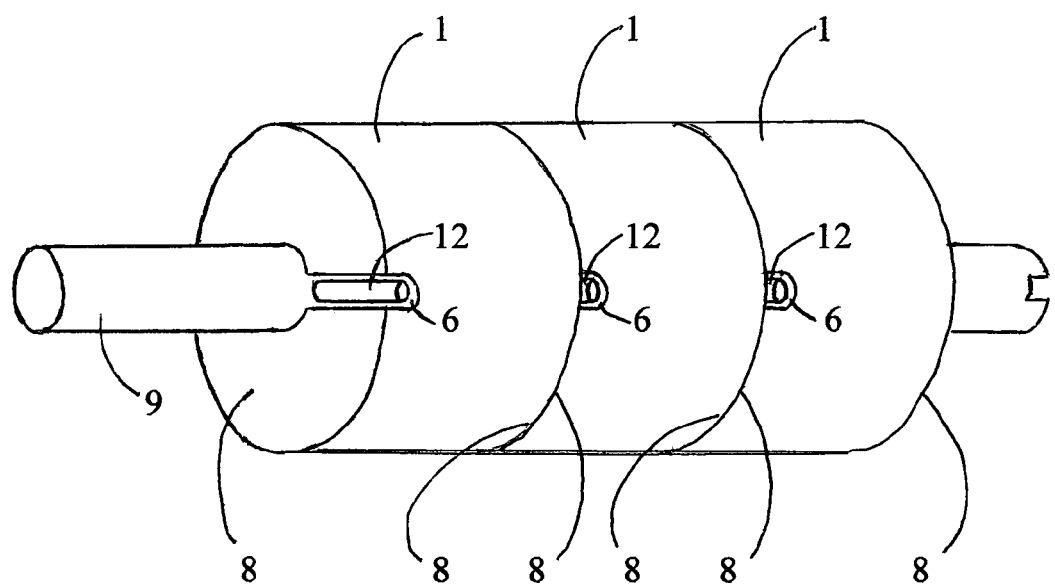

FIG. 5 shows another example of the coupling means the invention comprises.

In this example, a plurality of annular magnets 1, with a plurality of coupling means 6, and shaft 9 with a plurality of shaft alignment means 12 are used in the assembly.

FIGS. 4A and 4B- Reference Numerals

| 1 | annular permanent magnet | 2 | polar grain |
| 3 | magnet axis | 4 | magnet bore |

-continued

FIGS. 4A and 4B- Reference Numerals

| 5 | magnet inner surface | 6 | magnet coupling means |
| 7 | coupling means inner surface | 8 | flat outside surface |
| 9 | keyed shaft | 10 | shaft outer surface |
| 11 | mechanical key | 12 | shaft alignment means |
| 13 | alignment means outer surface | | |

DETAILED DESCRIPTION

FIGS. 4A and 4B

Preferred Embodiment

A preferred embodiment of the coupling means of the present invention is illustrated in FIGS. 4A (unassembled) and 4B (assembled). The method comprises pairing of an annular permanent magnet 1 of anisotropic material composition, and a shaft 9, with common rotor axis 3. The magnet 1 comprises a bore 4 with inner surface 5 on its inner diameter, a coupling means 6 with inner surface 7, and one polar grain 2 runs orthogonal to an imaginary plane along the axis 3 and extends the length of the magnet 1, bordered by flat outside surfaces 8. The coupling means 6 is positioned along said plane. The shaft 9, comprises an outer surface 10 on its outer diameter, a mechanical key 11, and a shaft alignment means 12 with alignment means outer surface 13. Additionally, the outer surface 10 of shaft 9 is always configured so that the diameter is slightly less than the diameter of the inner surface 5 of the magnet 1. Similarly, the diameter of the outer surface 13 of the alignment means 12 of the shaft 9 is always configured to be slightly less than the diameter of the inner surface 7 of the coupling means 6 of the magnet 1. Thus, when the shaft 9 is fitted in the bore 4 of the magnet 1, configured as show in FIG. 4B, the shaft alignment means 12 will rest within magnet coupling means 6, and, when attached by permanent means, said members cooperate to configure the assembly for specific rotary angle synchronization of a permanent magnetic field applied during a post-assembly magnetization process.

A second preferred embodiment of the configured method of the present invention is illustrated in FIG. 5. The embodiment differs principally from the method shown in FIGS. 4A and 4B in that it relates to the coupling means of a rotor with a plurality of annular magnets 1, a plurality of coupling means 6, and a plurality of shaft alignment means 12. Each member is arranged on the same shaft 9, in sequential order, such that magnets 1 located on opposite ends of the shaft have one exposed flat outside surface 8, and all other flat outside surfaces 8 of said magnets 1, and of any other magnets 1 in the assembly, border other outside surfaces 8.

ADVANTAGES

From the description above, a number of advantages of the method for post-assembly magnetic field synchronization become evident:

(a) Magnets can be purchased in un-magnetized form, allowing a myriad of process and handling benefits—
   No special shipping considerations to keep magnets apart during transport from the manufacturer;
   No need to keep track of polarity throughout the life of the stand-alone magnet;
   No need to create special handling containers to keep magnets well-separated and protected from magnetic metal and from each other during the assembly process; or to keep personnel protected from the magnets;

No need to keep stand-alone magnets clean of metal dust or debris during storage, handling, and assembly;

(b) Permanent magnet rotors can be handled in un-magnetized form, allowing numerous benefits—

No need to create special handling containers to keep rotors well-separated and protected from magnetic metal and from each other during the assembly process; or to keep personnel protected from the rotors; or, to keep rotors away from computers or electronics that they might otherwise damage;

No extraordinary considerations needed during the assembly process to keep otherwise magnetized magnets from drifting or migrating off of desired positions or orientations; or attracting or repelling from each other in undesired fashion during any adhesive cure cycles.

(c) Angular position of the permanent magnetic field automatically synchronizes, or keys to the mechanically-keyed shaft, allowing important system integration benefits—

No controls are needed to ensure coincident angular positions of magnet fields in rotors that comprise a plurality of permanent magnets;

No controls are needed to ensure angular position of the rotor during magnetization, reducing fixture requirements, number of process steps, and process error; thereby improving reliability and product quality;

Most importantly, the mechanical key of the rotor shaft can be used to synchronize a motor to a magnetically keyed load;

CONCLUSIONS, RAMIFICATIONS, AND SCOPE

Accordingly, the reader will see that random angle magnetization of a fully assembled shaft and permanent magnet rotor, via the coupling means described above, where the magnet and shaft are angularly keyed to the anisotropic magnet polar grain, will generate a rotor with a permanent magnet field that is orthogonal to the alignment means, thereby assuring a desired angular position of the permanent magnet field.

Although the description above contains many specifications, these should not be construed as limiting the scope of the invention but merely providing illustrations of some of the presently preferred embodiments of this invention. For example, the permanent magnet can have other shapes and field orientations, such as magnet(s) with hub, rotor bodies with a plurality of magnetic pole pairs, magnet coupling means of different configurations, etc., and/or the shaft can have other configurations such as temporary shaft alignment means or shaft alignment means on assembly fixtures instead of the shaft.

Thus the scope of the invention should be determined by the appended claims and their legal equivalents, rather than by the examples given.

I claim:

1. A process for making a magnetically keyed rotor, comprising the steps of:
a) Providing an un-magnetized annular permanent magnet of anisotropic material composition and corresponding molecular polarity grain, with said member having an axis and bore concentric with said axis, and said grain orthogonal to any plane containing said axis, and comprising the step of placing or integrating a coupling means within said plane and dividing a section of said grain into equal sections of opposite polarities, so as to form a grain-keyed magnet, and
b) Providing a mechanically keyed shaft, with said member having an axis, and comprising the step of adding or integrating an alignment means into said member, and synchronized with said member, so as to form an aligned shaft, and
c) Assembling said aligned shaft and said grain-keyed magnet by passing said shaft slidably through said hole in said magnet, allowing shaft and magnet axes to coincide, and allowing said alignment means in said shaft to align along said coupling means in said magnet, and applying a mechanical permanent attachment means between said shaft and said magnet, so as to form a mechanically keyed rotor assembly having an axis, and magnetizing said rotor assembly radially, flux orthogonal to said rotor axis, without regard to any rotational or angular reference key on any magnetization fixture, so as to form said permanent magnetic field, whereby said magnetization of said assembly in said random-angle fashion nevertheless angularly synchronizes said permanent magnetic field to said mechanically keyed shaft and forming a magnetically keyed rotor.

2. A process for making a magnetically keyed rotor, comprising the steps of:
a) Providing a plurality of un-magnetized annular permanent magnet of anisotropic material composition and corresponding molecular polarity grain, with said members each having an axis and bore concentric with said axis, and said grain orthogonal to any plane containing said axis, and comprising the step of placing or integrating a coupling means within said plane and dividing a section of said grain into equal sections of opposite polarities, so as to form a plurality of grain-keyed magnets, and
b) Providing a mechanically keyed shaft, with said shaft having an axis, and comprising the step of adding or integrating a plurality of modular alignment means into said shaft, with said plurality of alignment means occupied in a plane containing said axis, and synchronized with said shaft, so as to form an aligned shaft, and
c) Assembling said keyed shaft and said grain-keyed magnet by passing said shaft slidably through said holes in said magnets, allowing shaft and magnet axes to coincide, and allowing said plurality of modular alignment means to be added to the resulting assembly and to align along said plurality of coupling means in said plurality of magnets, and applying a mechanical permanent attachment means between said shaft and said plurality of magnets, so as to form a mechanically keyed rotor assembly having an axis, and
d) Magnetizing said rotor assembly radially, flux orthogonal to said rotor axis, without regard to any rotational or angular reference key on any magnetization fixture, so as to form said permanent magnetic field, whereby said magnetization of said assembly in said random-angle fashion nevertheless angularly synchronizes said permanent magnetic field to said mechanically keyed shaft and forming a magnetically keyed rotor.

* * * * *